Figure 1:
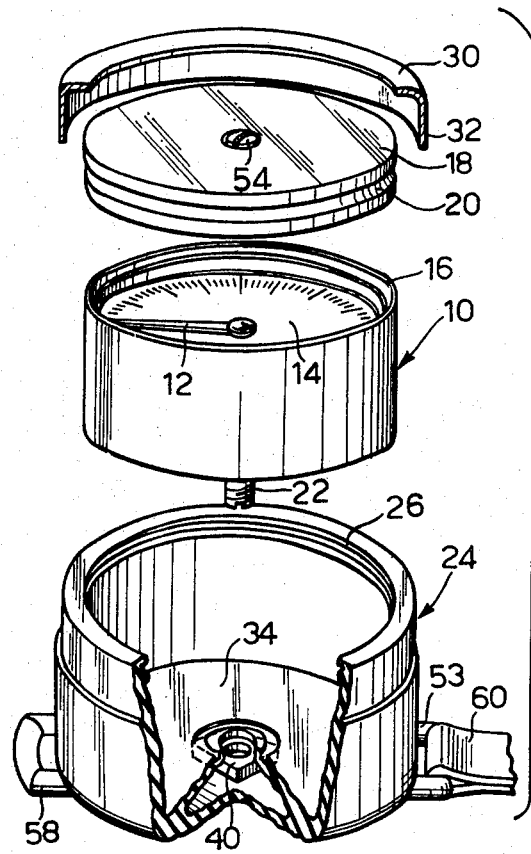

United States Patent
Alinari

[11] 3,712,138
[45] Jan. 23, 1973

[54] DEPTH GAUGES

[76] Inventor: Carlo Alinari, Corso Vittorio Emanuele 200, Turin, Italy

[22] Filed: Feb. 19, 1971

[21] Appl. No.: 116,791

[52] U.S. Cl. ..........................73/300, 73/418, 73/431
[51] Int. Cl. .........................G01f 23/14, G01l 19/14
[58] Field of Search.................73/411, 431, 418, 300

[56] References Cited

UNITED STATES PATENTS

| 3,203,244 | 8/1965 | Alinari | 73/431 X |
| 2,773,388 | 12/1956 | Prosser | 73/431 |
| 2,986,938 | 6/1961 | Grandstaff | 73/300 X |
| 3,357,394 | 12/1967 | Ingham et al. | 73/411 X |

Primary Examiner—Louis R. Prince
Assistant Examiner—Daniel M. Yasich
Attorney—Sughrue, Rothwell, Mion, Zinn & Macpeak

[57] ABSTRACT

A depth gauge is of the type having a cup-like body containing a Bourdon tube, a nipple on the body communicating with the interior of the tube. The body is enclosed in a resilient casing with the nipple passing sealingly through a wall in the casing. That wall is covered by a flexible membrane forming part of the casing, the space between the sall and membrane being filled with an inert liquid which also fills the nipple and bourdon tube. The surrounding pressure, acting on the membrane and through it on the inert liquid, actuates the gauge.

6 Claims, 2 Drawing Figures

PATENTED JAN 23 1973

3,712,138

INVENTOR

CARLO ALINARI

BY Sughrue, Rothwell, Mion,
Zinn & Macpeak
ATTORNEYS

DEPTH GAUGES

This invention relates to pressure gauges suitable for immersion in liquids to act as depth gauges.

As is well known, most pressure gauges have a cup-like body in which is contained a manometer in the form of a Bourdon tube. This is a curved tube, usually of oval cross-section, sealed from the space surrounding it. One end of the tube is fixed in the body and the other is arranged through a drive system to move an indicating member such as a needle over a dial. A difference in pressure in the tube relatively to the space surrounding it in the body causes the tube to flex, the extent of its flexure being indicated on the dial in terms of the pressure difference.

Two forms of construction are possible. In the first, the space surrounding the tube is kept at a reference pressure such as atmospheric pressure, and the fluid whose pressure is to be measured relatively to the reference pressure is admitted to the interior of the tube. The cup-like body is sealed from the surrounding atmosphere to maintain the reference pressure constant. A nipple projects from the body, communicating with the interior of the bourdon tube. The nipple may be connected to a gas cylinder or the like. If the gauge is to be exposed to corrosive fumes or the like, it may be provided with a protective casing or housing, having a wall through which the nipple extends. Such a casing is described in U.S. Pat. No. 2,773,388, inventor T.W. Prosser, in which the cup-like body is covered by a casing of resilient material that makes sealing contact with a transparent disc covering the dial, and the casing includes a wall that is perforated and through which the nipple extends and is sealed.

Even when provided with such a casing, however, this type of gauge is obviously not suitable for immersion in liquids such as sea water, which corrodes or encrusts the nipple and the interior of the Bourdon tube.

A pressure gauge of this type, i.e. in which the fluid whose pressure is to be measured acts on the interior of the Bourdon tube, is easy and convenient to make and use since it may initially be calibrated merely by sealing the cup-like body at the reference pressure, which can be varied at any time by opening the body.

In the other type of gauge, the Bourdon tube is totally sealed, and the fluid whose pressure is to be measured is admitted to the space surrounding the tube, acting on its outer surface. This is a comparatively easy instrument to adapt for use in corrosive liquids since the cup-like body can be made of or covered with a corrosion-proof material and filled with an inert liquid, a flexible membrane sealed to the body at its edge being provided to cover a hole in the body. The membrane is sensitive to the pressure of the surrounding atmosphere and transmits this pressure to the inert liquid. A depth gauge of this general type is described in U.S. Pat. No. 2,935,873, inventor T. Stewart. Another form, in which the body is itself made of a resilient material and includes a very thin wall providing a flexible diaphragm or membrane sensitive to the pressure of the surrounding atmosphere, is described in U.S. Pat. No. 3,203,244, inventor C. Alinari.

The disadvantage of this type of pressure gauge, however, is that once the reference pressure in Bourdon tube has been established and the tube sealed, it is not possible to alter that reference pressure.

The object of the invention is to overcome this problem by providing a pressure gauge in which the pressure to be measured effectively acts on the interior of the Bourdon tube but in which the Bourdon tube is sealed from the surrounding atmosphere, thus making the gauge suitable for immersion in corrosive liquids. In at least some embodiments, the gauge may permit the reference pressure to be varied at will.

The invention provides a pressure gauge suitable for immersion in a liquid, comprising a cup-like body containing a Bourdon tube, an indicating member arranged to be actuated by movement of the Bourdon tube, and a dial over which the indicating member is adapted to move, and including a transparent disc covering the dial, the body having projecting from it a nipple communicating with the interior of the Bourdon tube, the body being entirely covered by a one-piece casing of resilient material that makes sealing contact with the disc in the zone of the edge of such disc, the casing including a wall that is perforated and through which the nipple extends and is sealed by a securing member clamping the wall around the nipple to the body, the covering further including a flexible membrane one side of which covers the wall through which the nipple extends and defining with that wall an envelope filled with a liquid that enters the nipple to actuate the Bourdon tube, the other side of the membrane being directly exposed over its full area to the surrounding atmosphere.

It is important to have a perfectly secure seal between the nipple and the wall of the casing surrounding it, and the invention provides, at least in some embodiments, a special construction for this purpose.

Figure 2:
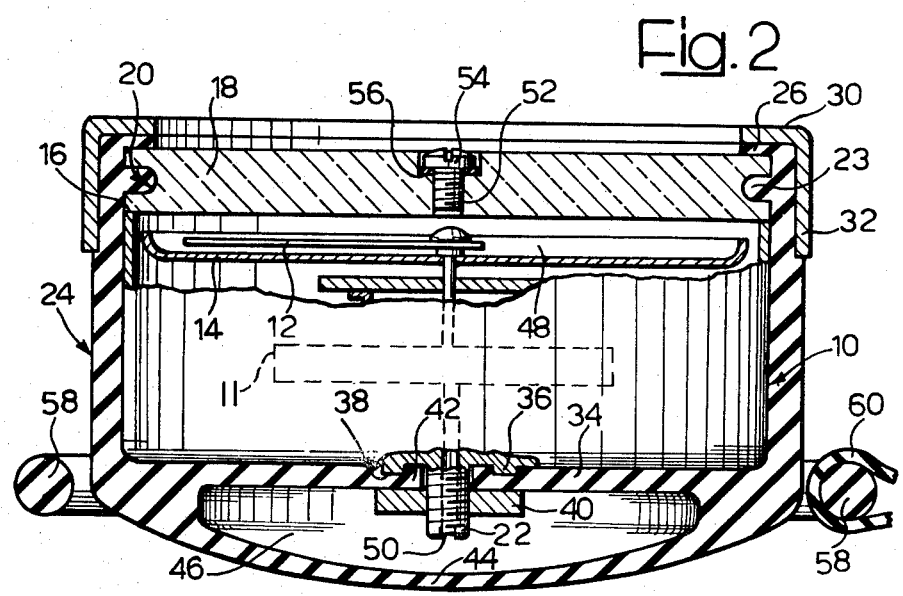

A preferred form of the invention is described below with reference to the accompanying drawings, in which:

FIG 1 is an exploded perspective view partly broken away, of key components of a pressure gauge; and FIG 2 is a partial sectional view through the assembled gauge of FIG 1.

The pressure gauge illustrated has a metal cup-like body 10 containing, in a conventional way not specifically illustrated, a Bourdon tube, 11 (illustrated schematically), an indicating member in the form of a needle 12 that is arranged to be driven by movement of the Bourdon tube, and a dial 14 over which the needle moves, the dial being calibrated in suitable units. A transparent disc 18 rests on an annular rim surface 16 of the body 10, the disc 18 having a groove 20 on its edge surface between its sides. A nipple 22 projects from the floor of the body 10, communicating in the conventional way with the interior of the Bourdon tube.

The body 10 is entirely covered by a one-piece casing 24 of resilient plastics material, also generally of cup-like shape. The casing 24 has a radially inward flange 26 which makes sealing contact with the exposed upper side of the disc 18 in the zone of its edge, and an inward annular ridge 28 which seats firmly in the groove 20 in the edge surface of the disc. The disc 18 is held firmly down on the rim 16 of the body 10 by the resilience of the casing 24. To reinforce this closure of the body 10 by the disc 18, a metal retaining ring 30 is force-fitted on to the gauge. It includes a cylindrical skirt 32 which covers the full thickness of the disc 18 and also a portion of the adjoining cylindrical surface of the body 10 below its rim 16.

The casing 24 includes a wall 34 that abuts the floor of the body 10. This floor is formed with an annular ridge 36 around the nipple 22. The wall 34 is perforated to receive the nipple 22, and has a groove 38 accommodating the ridge 36. A nut 40 is threaded on to the nipple 22, engaging the wall 34 in the zone of the ridge 36 and groove 38, and thus in effect trapping a ring 42 of the material of the casing 24 between the nipple 22 and such ridge and groove. This construction provides extremely effective sealing of the wall 34 to the nipple 22 and to the body 10.

The casing 24 further includes a membrane 44, one side of which covers the wall 34 to define with that wall an envelope or reservoir that is filled with an inert liquid 46 such as an oil that enters the nipple 22 and the Bourdon tube 11 to actuate the gauge. The membrane 44 is sufficiently thin and flexible to be sensitive to the pressure in the surrounding atmosphere, to which the full area of its second side is directly exposed, so that the pressure of that atmosphere effectively acts in the Bourdon tube and is thus measured on the dial 14 relatively to the reference pressure prevailing in the space 48 in the body 10 surrounding the Bourdon tube.

The nipple 22 has on its outermost end a groove 50 which ensures that, even if the membrane 44 is pressed against the nipple, liquid may pass freely into and from the nipple.

At its center, the disc 18 has a hole 52 through its thickness, closed by a removable member in the form of a screw 54. A resilient washer 56 ensures sealing of the hole 52 by the screw 54.

To make the gauge suitable for wearing on a diver's wrist, it may have eyes 58 on the casing 24, and a strap seen fragmentarily at 60.

Once the body 10 and its contents have been assembled in the normal way, assembly of the gauge proceeds as follows. The nut 40 is introduced through the perforation in the wall 34 of the casing 24 to enter the envelope between that wall and the membrane 44. The material of the casing 24 is sufficiently resilient to permit distortion of the wall 34 for this purpose. The casing 24 is then turned inside-out and the nut 40 is held through the membrane 44 in the correct position. The body 10 is juxtaposed to the floor 34 and the nipple 22 is passed through the perforation to enter the nut 40. The nut and the body 10 are then rotated relatively to each other until the nut is fully screwed on to the nipple 22 as seen in FIG 2. The casing is then returned to its normal posture and the disc 18 is worked into its correct position on the rim 16, with the ridge 28 on the casing 24 engaging in the groove 20. The ring 30 is then pressed into place.

The instrument is then inverted and air in the envelope between the casing wall 34 and the membrane 44, together with air in the nipple 22 and the Bourdon tube, is evacuated through a hypodermic syringe whose needle is forced through the membrane. The syringe contains the oil 46, which is injected progressively into the envelope when it is evacuated. After the envelope has been filled, no air remaining in it, the syringe is withdrawn and if necessary a dab of a sealing compound, or a covering patch, is applied to the perforation made by the needle in the membrane.

The instrument may be calibrated by removing the screw 54 and replacing it while the instrument is exposed to the desired reference pressure, such as atmospheric pressure. This pressure can be changed at any later time by simply removing and replacing the screw 54 to expose the space inside the gauge to the new reference pressure.

What I claim is:

1. A depth gauge comprising a cup-like body containing a manometer an indicating member arranged to be actuated by said manometer and a dial over which the indicating member is adapted to move and including a one piece casing of resilient material entirely covering said body which includes a transparent disc covering the dial and bearing on an annular surface of the body, the body having projecting from the center of the base of the body a nipple communicating with the interior of the manometer, the one-piece casing being disposed in sealing contact with the disc in the zone of the edge of such disc to hold the disc on said annular surface of said body, the casing including a wall having an aperture through which the nipple extends, the wall being sealed to the base of said body by a securing member coacting with the nipple to clamp the wall around the nipple to the body, the casing further including a flexible membrane one side of which covers the wall through which the nipple extends and defining with that wall an envelope filled with a liquid that enters the nipple to actuate the manometer, the other side of the membrane being directly exposed over its full area to the surrounding atmosphere.

2. The depth gauge of claim 1 in which the transparent disc has a groove on its edge surface between its sides, the casing having a radially inward annular ridge that seats in such groove.

3. The depth gauge of claim 2 in which a retaining ring with a cylindrical skirt is fitted under pressure over the casing in the zone where the casing covers the transparent disc, the skirt of the ring covering the full thickness of the disc and a portion of the adjoining surface of the cup-like body.

4. The depth gauge of claim 1 in which the securing member is a threaded nut and the nipple is threaded to receive the nut, the cup-like body having an annular ridge surrounding the nipple, and the wall of the resilient casing through which the nipple extends having a groove accommodating the ridge, the securing nut bearing on the casing in the zone of such rib and groove.

5. The depth gauge of claim 1, including a hole in the thickness of the transparent disc, the hole communicating with the space in the cup-like body surrounding the manometer, and including a removable member sealingly closing such hole.

6. The depth gauge of claim 1, in which the nipple has on its outermost end a groove to permit free passage of the liquid in the envelope even when the membrane is pressed against such end.

* * * * *